(12) United States Patent
Barbu et al.

(10) Patent No.: US 12,342,312 B2
(45) Date of Patent: Jun. 24, 2025

(54) POSITIONING MEASUREMENTS (71) Applicant: Nokia Technologies Oy, Espoo (FI)

(72) Inventors: Oana-Elena Barbu, Aalborg (DK); Diomidis Michalopoulos, Munich (DE)

(73) Assignee: Nokia Technologies Oy, Espoo (FI)

( * ) Notice: Subject to any disclaimer, the term of this patent is extended or adjusted under 35 U.S.C. 154(b) by 278 days.

(21) Appl. No.: 17/897,615

(22) Filed: Aug. 29, 2022

(65) Prior Publication Data

US 2023/0082198 A1    Mar. 16, 2023

(30) Foreign Application Priority Data

Sep. 3, 2021 (EP) .................................. 21194843

(51) Int. Cl.
*H04W 64/00* (2009.01)
*H04L 5/00* (2006.01)
*H04L 25/02* (2006.01)

(52) U.S. Cl.
CPC .......... *H04W 64/00* (2013.01); *H04L 5/0048* (2013.01); *H04L 25/0212* (2013.01); *H04L 25/0228* (2013.01)

(58) Field of Classification Search
CPC .. H04W 64/00; H04L 5/0048; H04L 25/0212; H04L 25/0228
See application file for complete search history.

(56) References Cited

U.S. PATENT DOCUMENTS

| | | | |
|---|---|---|---|
| 9,037,155 B2 | 5/2015 | Fischer et al. | |
| 10,306,405 B2 | 5/2019 | Persson et al. | |
| 2010/0304744 A1 | 12/2010 | Hu et al. | |
| 2012/0288022 A1 | 11/2012 | Guey et al. | |
| 2020/0166601 A1 | 5/2020 | Chen et al. | |

FOREIGN PATENT DOCUMENTS

| | | |
|---|---|---|
| CN | 113286362 A | 8/2021 |
| JP | 2013181876 A | 9/2013 |
| WO | 2020/128760 A1 | 6/2020 |

OTHER PUBLICATIONS

Office action received for corresponding Chinese Patent Application No. 202211071066.0, dated May 31, 2024, 7 pages of office action and 5 pages of translation available.
"Verification of FR2 channel models in MPAC system", 3GPP TSG RAN WG4 Meeting #94, R4-2002100, Agenda: 10.2.3.2, Spirent Communications, Feb. 24-28, 2020, 5 pages.

(Continued)

*Primary Examiner* — Natasha W Cosme
(74) *Attorney, Agent, or Firm* — McCarter & English, LLP (57) ABSTRACT

Disclosed herein are systems, methods and/or computer programs for determining time and/or angle-based measurements for use in position determination. The apparatus may comprise means for receiving, at a plurality of antennae, a reference signal associated with positioning and determining cross-correlation values comprising a cross correlation between the reference signal received at each antenna and a known reference signal associated with positioning. There may also be provided means for estimating a channel response for a reference antenna of the plurality of antennae using the cross correlation values, the known reference signal and an antenna correlation comprising a known relationship between a channel response of each antenna of the plurality of antennae and the channel response of the reference antenna, and determining a time of arrival and/or an angle of arrival of the received reference signal based on the estimated channel response for the reference antenna.

19 Claims, 5 Drawing Sheets

(56) References Cited

OTHER PUBLICATIONS

"3rd Generation Partnership Project; Technical Specification Group Services and System Aspects; Service requirements for the 5G system; Stage 1 (Release 18)", 3GPP TS 22.261, V18.2.0, Mar. 2021, 85 pages.

"New SID on NR Positioning Enhancements", 3GPP TSG RAN Meeting #86, RP-193237, Agenda: 9.1.1, Qualcomm Incorporated, Dec. 9-12, 2019, 4 pages.

Manap et al., "Performance Analysis of TOA-based Positioning in LTE by utilizing MIMO Feature", Journal of Telecommunication, Electronic and Computer Engineering (JTEC), vol. 9, No. 2-13, 2017, pp. 117-121.

"3rd Generation Partnership Project; Technical Specification Group Services and System Aspects; Study on Communication for Automation in Vertical Domains (Release 16)", 3GPP TR 22.804, V16.3.0, Jul. 2020, pp. 1-197.

Al-Jazzar et al., "Low Complexity and High Accuracy Angle of Arrival Estimation Using Eigenvalue Decomposition with Extension to 2D AOA and Power Estimation", EURASIP Journal on Wireless Communications and Networking, Article No. 123, 2011, pp. 1-13.

"Bluetooth Indoor Positioning", u-blox, Retrieved on Aug. 29, 2022, Webpage available at : https://www.u-blox.com/en/technologies/bluetooth-indoor-positioning.

Extended European Search Report received for corresponding European Patent Application No. 21194843.5, dated Apr. 19, 2022, 7 pages.

POSITIONING MEASUREMENTS

FIELD

Example embodiments may relate to systems, methods and/or computer programs for determining time and/or angle-based measurements for use in position determination, for example for position determination of a user equipment (UE) based on reference signals.

BACKGROUND

In a radio access network (RAN), the position of a UE can be determined using a number of methods. One method is for the UE to estimate, using received downlink (DL) positioning reference signals (PRS) transmitted by each of a plurality of transmit receive points (TRPs), a time of arrival (ToA) and/or angle of arrival (AoA) measurement. The estimates can be reported to a network function of the RAN, such as a location management function (LMF) which resides in the core infrastructure, for computation of the UE's position using known multilateration techniques. Alternatively, the UE can use assistance information from the RAN for computing its own position, again using known multilateration techniques. Position determination may be useful for, for example, optimization of radio resources, provision of position-based radio or data services, and/or emergency positioning.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is described an apparatus comprising means for: receiving, at a plurality of antennae, a reference signal associated with positioning; determining cross-correlation values comprising a cross correlation between the reference signal received at each antenna and a known reference signal associated with positioning; estimating a channel response for a reference antenna of the plurality of antennae using the cross correlation values, the known reference signal and an antenna correlation comprising a known relationship between a channel response of each antenna of the plurality of antennae and the channel response of the reference antenna; and determining a time of arrival and/or an angle of arrival of the received reference signal based on the estimated channel response for the reference antenna.

The means for determining the time of arrival of the received reference signal may be configured for: determining the time of arrival of the received reference signal based on estimating the time delay in which a maximum power associated with the estimated channel response of the reference antenna occurs; and/or determining the angle of arrival of the received reference signal based on estimating the phase of the estimated channel response at which the maximum power associated with the estimated channel response occurs.

The means for determining the time of arrival of the received reference signal may be configured for: determining the time of arrival of the received reference signal based on estimating the time delay at which the power associated with the estimated channel response reaches a predetermined threshold; and/or determining the angle of arrival of the received reference signal based on estimating the phase of the estimated channel response at which the power associated with the estimated channel response reaches the predetermined threshold.

The means for estimating the channel response for the reference antenna may be configured for performing the channel estimation based on minimising a function of the difference between the cross-correlation values and a product of a projection matrix and the channel response for the reference antenna, wherein the projection matrix encodes the known reference signal and the antenna correlation.

The means for estimating the channel response for the reference antenna may be further configured for estimating a set of L-multipath channel response complex gains representing the estimated channel response of the received reference signal, where L is the number of multipath components received by each antenna.

The means for determining the time of arrival of the received reference signal may be configured for: selecting the multipath channel response complex gain from the set of L-multipath channel response complex gains with the maximum power; and determining the time delay associated with the selected multipath channel response complex gain.

The means for determining the time of arrival of the received reference signal may be configured for: selecting the earliest multipath channel response complex gain from the set of L-multipath channel response complex gains with a power that reaches a predetermined threshold; and determining the time delay associated with the selected multipath channel response complex gain.

The means for determining the angle of arrival of the received reference signal may be configured for determining the phase of the selected multipath channel response complex gain.

In some embodiments, $r_s$ may be a vector of the cross-correlation values corresponding the plurality of antennae receiving the reference signal at time index s; V may be a projection matrix based on the antenna correlation between the channel response of each antenna of the plurality of antennae and the channel response of the reference antenna and autocorrelation values of the known reference signal in relation to the plurality of antennae and L multipath components; and $\alpha_s^{(1)}$ may be a vector of the set of L-multipath channel response complex gains representing the channel response of the reference antenna for time index s; and wherein the means for estimating the channel response for the reference antenna is configured estimate the channel response for the reference antenna based on solving $V\alpha_s^{(1)} = r_s$.

The means for estimating the channel response for the reference antenna may be configured to use an iterative minimisation technique based on at least one from the group of: minimum mean squared error; least squared error; and any other minimisation technique for solving $V\alpha_s^{(1)} = r_s$.

In some embodiments, the means for estimating the channel response for the reference antenna may be configured to estimate the channel response using an iterative minimisation technique based on: initialising a residual signal to be $r_s$ and a noise level greater than 0; for each iteration up to a maximum number of iterations, iteratively estimating complex tap gains of $\alpha_s^{(1)}$ by: applying a filter based on V to the residual signal; determining those components of the filtered residual signal with a power greater than the noise level, and storing indices of the determined components to an index set; updating a selection of complex tap gains of $\alpha_s^{(1)}$ corresponding to the index set based on V and $r_s$; updating the noise level estimate based on the updated complex tap gains of $\alpha_s^{(1)}$, $r_s$, V and the number of samples N; and updating the residual signal based on the index set, updated complex tap gains of $\alpha_s^{(1)}$, $r_s$, and V; wherein, on termination of iteratively estimating the complex tap gains of $\alpha_s^{(1)}$, outputting the estimated complex tap gains of $\alpha_s^{(1)}$.

The means for determining the time of arrival of the received reference signal may be configured for: determining the time of arrival of the received reference signal based on determining the index of the complex tap gains from the estimated complex tap gains of $\alpha_s^{(1)}$ that has a maximum power value, and estimating the time delay based on multiplication of the determined index and the sampling time, Ts; and/or determining the angle of arrival of the received reference signal based on estimating the phase of the estimated determined complex tap gain.

The means for determining the time of arrival of the received reference signal may be configured for: determining the time of arrival of the received reference signal based on determining the minimum index of a complex tap gain from the estimated complex tap gains of $\alpha_s^{(1)}$ that has a power value above a predetermined threshold, and estimating the time delay based on multiplication of the determined minimum index and the sampling time, Ts; and/or determining the angle of arrival of the received reference signal based on estimating the phase of the estimated determined complex tap gain.

The noise level, $\sigma_i^2$, may be updated in each i-th iteration based on $$\sigma_i^2 \leftarrow \frac{const.}{\lambda_i}, \text{ where } \lambda_i = \frac{N}{\|r_s - v_{I_i}\alpha^{(1)}(I_i)\|_2^2}$$

and const. is a predetermined constant >0.

The noise level, $\sigma_i^2$, may be updated in each i-th iteration based on $$\sigma_i^2 \leftarrow \frac{z_i}{\lambda_i}, \text{ where } z_i = const. \times \delta_i, \delta_i \in \{i, i^2, \ldots\}, \text{ and}$$

$$\lambda_i = \frac{N}{\|r_s - v_{I_i}\alpha^{(1)}(I_i)\|_2^2},$$

and const. is a predetermined constant >0.

In some embodiments, for a number A of the plurality of antennae for $1 \leq a \leq A$ in which antenna $\alpha=1$ is the reference antenna, the means for estimating the channel response of the reference antenna may be configured for estimating a channel response gain vector for the reference antenna, denoted $\widehat{\alpha^{(1)}}$, based on iteratively solving $$\widehat{\alpha^{(1)}} = \operatorname{argmin} \|r_s - V\alpha_s^{(1)}\|_2^2$$

at time s, where $$r_s = [r_s^{(1)T}, \ldots, r_S^{(A)T}]^T,$$

where $r_s^{(a)}$ is vector of cross-correlation values between N samples of the received reference signal for antenna a and the known reference signal; the matrix $V = [\Gamma^T, c(2)\Gamma^T, \ldots c(A)\Gamma^T]^T$, where c(a) is the antenna correlation between the reference antenna and antenna a, for $2 \leq a \leq A$; $\Gamma$ is an autocorrelation matrix in which $\Gamma(n,l) = \gamma((n-l)T_s)$, $\gamma$ is the autocorrelation function of the known reference signal for sample n and multipath component l for $1 \leq n \leq N$ and $1 \leq l \leq L$, where N is the number of samples in the received reference signal, L is the number of multipath components and Ts is the sampling time of the system;

$$a_s^{(1)} = [a_s^{(1)}(1), \ldots, \alpha_s^{(1)}(L)]^T$$

is the L-multipath channel response at time index s and reference antenna a=1, in which $\alpha_s^{(1)}(l)$ is the complex gain of the –l-th multipath component, for $1 \leq l \leq L$.

In some embodiments, the means for estimating the channel response for the reference antenna may be configured for instantiating the projection matrix V with a dynamic delay resolution d and range R based on:

$$V \leftarrow \begin{bmatrix} \Gamma \\ \ldots \\ c(A)\Gamma \end{bmatrix};$$

$$\Gamma(n, 1) = \gamma(nT_s - ld), l = R/d.$$

In some embodiments, the means for estimating the channel response for the reference antenna may be configured to estimate and track the delay-profile of a predetermined number of components of the channel response estimations and terminating the estimating of the channel response when there is no change to the delay-profile from a previous channel response estimation.

In some embodiments, the means for receiving, at the plurality of antennae, the reference signal associated with positioning may be configured for receiving, at the plurality of antennae of a user equipment, a set of samples of the reference signal for a current time index s, and concatenating the current sets of received samples with one or more past sets of received samples received at the plurality of antenna to form a super-sequence of received samples of the reference signal for use in estimating the channel response of the reference antenna.

In some embodiments, the means for receiving, at the plurality of antennae, the reference signal associated with positioning may be configured for receiving, at the plurality of antennae, a number of samples N of the reference signal, wherein N is proportional to the channel coherence time.

In some embodiments, the reference signal associated with positioning is an Orthogonal Frequency Division Multiplexing, OFDM, signal and the means for receiving, at the plurality of antennae, the reference signal is configured for OFDM demodulating, for each of the plurality of antennae, a set of OFDM samples of the OFDM reference signal for a current time index s, and concatenating the current sets of received samples with one or more past sets of received OFDM samples received at the plurality of antenna for use in estimating the channel response of the reference antenna.

In some embodiments, the apparatus and plurality of antennae may be associated with a user equipment and the received reference signal associated with positioning may be a positioning reference signal, PRS.

In some embodiments, the apparatus and plurality of antennae may be associated with a base station and the received reference signal associated with positioning may be a sounding reference signal, SRS.

According to a second aspect, there is described a method comprising: receiving, at a plurality of antennae, a reference signal associated with positioning; determining cross-correlation values comprising a cross correlation between the reference signal received at each antenna and a known reference signal associated with positioning; estimating a channel response for a reference antenna of the plurality of antennae using the cross correlation values, the known reference signal and an antenna correlation comprising a known relationship between a channel response of each antenna of the plurality of antennae and the channel response of the reference antenna; determining a time of arrival and/or an angle of arrival of the received reference signal based on the estimated channel response for the reference antenna.

Determining the time of arrival of the received reference signal may comprise: determining the time of arrival of the received reference signal based on estimating the time delay in which a maximum power associated with the estimated channel response of the reference antenna occurs; and/or determining the angle of arrival of the received reference signal based on estimating the phase of the estimated channel response at which the maximum power associated with the estimated channel response occurs.

Determining the time of arrival of the received reference signal may comprise: determining the time of arrival of the received reference signal based on estimating the time delay at which the power associated with the estimated channel response reaches a predetermined threshold; and/or determining the angle of arrival of the received reference signal based on estimating the phase of the estimated channel response at which the power associated with the estimated channel response reaches the predetermined threshold.

Estimating the channel response for the reference antenna may comprise performing the channel estimation based on minimising a function of the difference between the cross-correlation values and a product of a projection matrix and the channel response for the reference antenna, wherein the projection matrix encodes the known reference signal and the antenna correlation.

Estimating the channel response for the reference antenna may comprise estimating a set of L-multipath channel response complex gains representing the estimated channel response of the received reference signal, where L is the number of multipath components received by each antenna.

Determining the time of arrival of the received reference signal may comprise: selecting the multipath channel response complex gain from the set of L-multipath channel response complex gains with the maximum power; and determining the time delay associated with the selected multipath channel response complex gain.

Determining the time of arrival of the received reference signal may comprise: selecting the earliest multipath channel response complex gain from the set of L-multipath channel response complex gains with a power that reaches a predetermined threshold; and determining the time delay associated with the selected multipath channel response complex gain.

Determining the angle of arrival of the received reference signal may be configured for determining the phase of the selected multipath channel response complex gain.

In some embodiments, $r_s$ may be a vector of the cross-correlation values corresponding the plurality of antennae receiving the reference signal at time index s; V may be a projection matrix based on the antenna correlation between the channel response of each antenna of the plurality of antennae and the channel response of the reference antenna and autocorrelation values of the known reference signal in relation to the plurality of antennae and L multipath components; and $\alpha_s^{(1)}$ may be a vector of the set of L-multipath channel response complex gains representing the channel response of the reference antenna for time index s; and wherein estimating the channel response for the reference antenna is configured estimate the channel response for the reference antenna based on solving $V\alpha_s^{(1)} = r_s$.

Estimating the channel response for the reference antenna may be configured to use an iterative minimisation technique based on at least one from the group of: minimum mean squared error; least squared error; and any other minimisation technique for solving $V\alpha_s^{(1)} = r_s$.

Estimating the channel response for the reference antenna may comprise estimating the channel response using an iterative minimisation technique based on: initialising a residual signal to be $r_s$ and a noise level greater than 0; for each iteration up to a maximum number of iterations, iteratively estimating complex tap gains of $\alpha_s^{(1)}$ by: applying a filter based on V to the residual signal; determining those components of the filtered residual signal with a power greater than the noise level, and storing indices of the determined components to an index set; updating a selection of complex tap gains of $\alpha_s^{(1)}$ corresponding to the index set based on V and $r_s$; updating the noise level estimate based on the updated complex tap gains of $\alpha_s^{(1)}$, $r_s$, V and the number of samples N; and updating the residual signal based on the index set, updated complex tap gains of $\alpha_s^{(1)}$, $r_s$, and V; wherein, on termination of iteratively estimating the complex tap gains of $\alpha_s^{(1)}$, outputting the estimated complex tap gains of $\alpha_s^{(1)}$.

Determining the time of arrival of the received reference signal may comprise: determining the time of arrival of the received reference signal based on determining the index of the complex tap gains from the estimated complex tap gains of $\alpha_s^{(1)}$ that has a maximum power value, and estimating the time delay based on multiplication of the determined index and the sampling time, Ts; and/or determining the angle of arrival of the received reference signal based on estimating the phase of the estimated determined complex tap gain.

Determining the time of arrival of the received reference signal may comprise: determining the time of arrival of the received reference signal based on determining the minimum index of a complex tap gain from the estimated complex tap gains of $\alpha_s^{(1)}$ that has a power value above a predetermined threshold, and estimating the time delay based on multiplication of the determined minimum index and the sampling time, Ts; and/or determining the angle of arrival of the received reference signal based on estimating the phase of the estimated determined complex tap gain.

The noise level, $\sigma_i^2$, may be updated in each i-th iteration based on $$\sigma_i^2 \leftarrow \frac{const.}{\lambda_i}, \text{ where } \lambda_i = \frac{N}{\|r_s - v_{I_i}\alpha^{(1)}(I_i)\|_2^2}$$

and const. is a predetermined constant >0.

The noise level, $\sigma_i^2$, may be updated in each i-th iteration based on $$\sigma_i^2 \leftarrow \frac{z_i}{\lambda_i}, \text{ where } z_i = const. \times \delta_i, \delta_i \in \{i, i^2, \ldots\}, \text{ and}$$

$$\lambda_i = \frac{N}{\left\|r_s - v_{I_i}\alpha^{(1)}(I_i)\right\|_2^2},$$

and const. is a predetermined constant >0.

In some embodiments, for a number A of the plurality of antennae for 1≤a≤A in which antenna a=1 is the reference antenna, estimating the channel response of the reference antenna may comprise estimating a channel response gain vector for the reference antenna, denoted $\widehat{\alpha^{(1)}}$, based on iteratively solving $$\widehat{\alpha^{(1)}} = \operatorname{argmin}\left\|r_s - V\alpha_s^{(1)}\right\|_2^2$$

at time s, where $$r_s = \left[r_s^{(1)T}, \ldots, r_s^{(A)T}\right]^T,$$

where $r_s^{(a)}$ is vector of cross-correlation values between N samples of the received reference signal for antenna a and the known reference signal; the matrix $V=[\Gamma^T, c(2)\Gamma^T, \ldots c(A)\Gamma^T]^T$, where c(a) is the antenna correlation between the reference antenna and antenna a, for 2≤a≤A; Γ is an autocorrelation matrix in which $\Gamma(n,l)=\gamma((n-l)T_s)$, γ is the autocorrelation function of the known reference signal for sample n and multipath component l for 1≤n≤N and 1≤l≤L, where N is the number of samples in the received reference signal, L is the number of multipath components and Ts is the sampling time of the system; $\alpha_s^{(1)}=[\alpha_s^{(1)}(1), \ldots, \alpha_s^{(1)}(L)]^T$ is the L-multipath channel response at time index s and reference antenna a=1, in which $\alpha_s^{(1)}(l)$ is the complex gain of the –l-th multipath component, for 1≤l≤L.

In some embodiments, estimating the channel response for the reference antenna may comprise instantiating the projection matrix V with a dynamic delay resolution d and range R based on:

$$V \leftarrow \begin{bmatrix} \Gamma \\ \ldots \\ c(A)\Gamma \end{bmatrix};$$

$$\Gamma(n, 1) = \gamma(nT_s - ld), l = R/d.$$

In some embodiments, estimating the channel response for the reference antenna may comprise estimating and tracking the delay-profile of a predetermined number of components of the channel response estimations and terminating the estimating of the channel response when there is no change to the delay-profile from a previous channel response estimation.

In some embodiments, receiving, at the plurality of antennae, the reference signal associated with positioning may comprise receiving, at the plurality of antennae of a user equipment, a set of samples of the reference signal for a current time index s, and concatenating the current sets of received samples with one or more past sets of received samples received at the plurality of antenna to form a super-sequence of received samples of the reference signal for use in estimating the channel response of the reference antenna.

In some embodiments, receiving, at the plurality of antennae, the reference signal associated with positioning may comprise receiving, at the plurality of antennae, a number of samples N of the reference signal, wherein N is proportional to the channel coherence time.

In some embodiments, the reference signal associated with positioning is an Orthogonal Frequency Division Multiplexing, OFDM, signal and receiving, at the plurality of antennae, the reference signal may comprise OFDM demodulating, for each of the plurality of antennae, a set of OFDM samples of the OFDM reference signal for a current time index s, and concatenating the current sets of received samples with one or more past sets of received OFDM samples received at the plurality of antenna for use in estimating the channel response of the reference antenna.

In some embodiments, the method may be associated with a user equipment and the received reference signal associated with positioning may be a positioning reference signal, PRS.

In some embodiments, the method may be associated with a base station and the received reference signal associated with positioning may be a sounding reference signal, SRS.

According to a third aspect, there is provided a computer program product comprising a set of instructions which, when executed on an apparatus, is configured to cause the apparatus to carry out the method of any preceding method definition.

According to a fourth aspect, there is provided a non-transitory computer readable medium comprising program instructions stored thereon for performing a method, comprising: receiving, at a plurality of antennae, a reference signal associated with positioning; determining cross-correlation values comprising a cross correlation between the reference signal received at each antenna and a known reference signal associated with positioning; estimating a channel response for a reference antenna of the plurality of antennae using the cross correlation values, the known reference signal and an antenna correlation comprising a known relationship between a channel response of each antenna of the plurality of antennae and the channel response of the reference antenna; determining a time of arrival and/or an angle of arrival of the received reference signal based on the estimated channel response for the reference antenna.

The program instructions of the fourth aspect may also perform operations according to any preceding method definition of the second aspect.

According to a fifth aspect, there is provided an apparatus comprising: at least one processor; and at least one memory including computer program code which, when executed by the at least one processor, causes the apparatus: to receive, at a plurality of antennae, a reference signal associated with positioning; to determine cross-correlation values comprising a cross correlation between the reference signal received at each antenna and a known reference signal associated with positioning; to estimate a channel response for a reference antenna of the plurality of antennae using the cross correlation values, the known reference signal and an antenna correlation comprising a known relationship between a channel response of each antenna of the plurality of antennae and the channel response of the reference antenna; and to determine a time of arrival and/or an angle of arrival of the received reference signal based on the estimated channel response for the reference antenna.

The computer program code of the fifth aspect may also perform operations according to any preceding method definition of the second aspect.

BRIEF DESCRIPTION OF THE DRAWINGS

Example embodiments will now be described by way of non-limiting example, with reference to the accompanying drawings, in which.

DETAILED DESCRIPTION

Example embodiments may relate to systems, methods and/or computer programs for determining time and/or angle-based measurements for use in position determination, for example for position determination of a user equipment (UE) based on reference signals. Such reference signals may comprise, but are not limited to, positioning reference signals (PRS) sent from each of a plurality of transmission points (TRPs) on respective downlinks (DLs).

As will be appreciated, in a (RAN), the position of a UE can be determined using a number of methods. One method is for the UE to estimate, for received DL PRSs transmitted by each of a plurality of TRPs, a time of arrival (ToA) and/or angle of arrival (AoA) measurement. The estimates can be reported to a network function of the RAN, such as a location management function (LMF) which resides in the core infrastructure, for computation of the UEs position using known multilateration techniques. Alternatively, the UE can use assistance information from the RAN for computing its own position, again using known multilateration techniques.

Positioning may be useful for, for example, optimization of radio resources, provision of position-based radio or data services, and/or emergency positioning. Positioning may also be an enabler for emerging use cases, such as in indoor industrial settings and/or complementing satellite-based positioning. For example the UEs as referred to herein may be automated guided vehicles (AGVs) which need to be tracked in terms of up-to-date position. Such larger forms of UE may carry, and have sufficient power supply for powering, an antenna array comprised of multiple elements. The use of antennas comprising multiple elements may improve effectiveness of measuring reference signals (e.g. PRSs) and hence obtain more accurate estimates of ToA and/or AoA which in turn may improve overall positioning accuracy.

Figure 1:
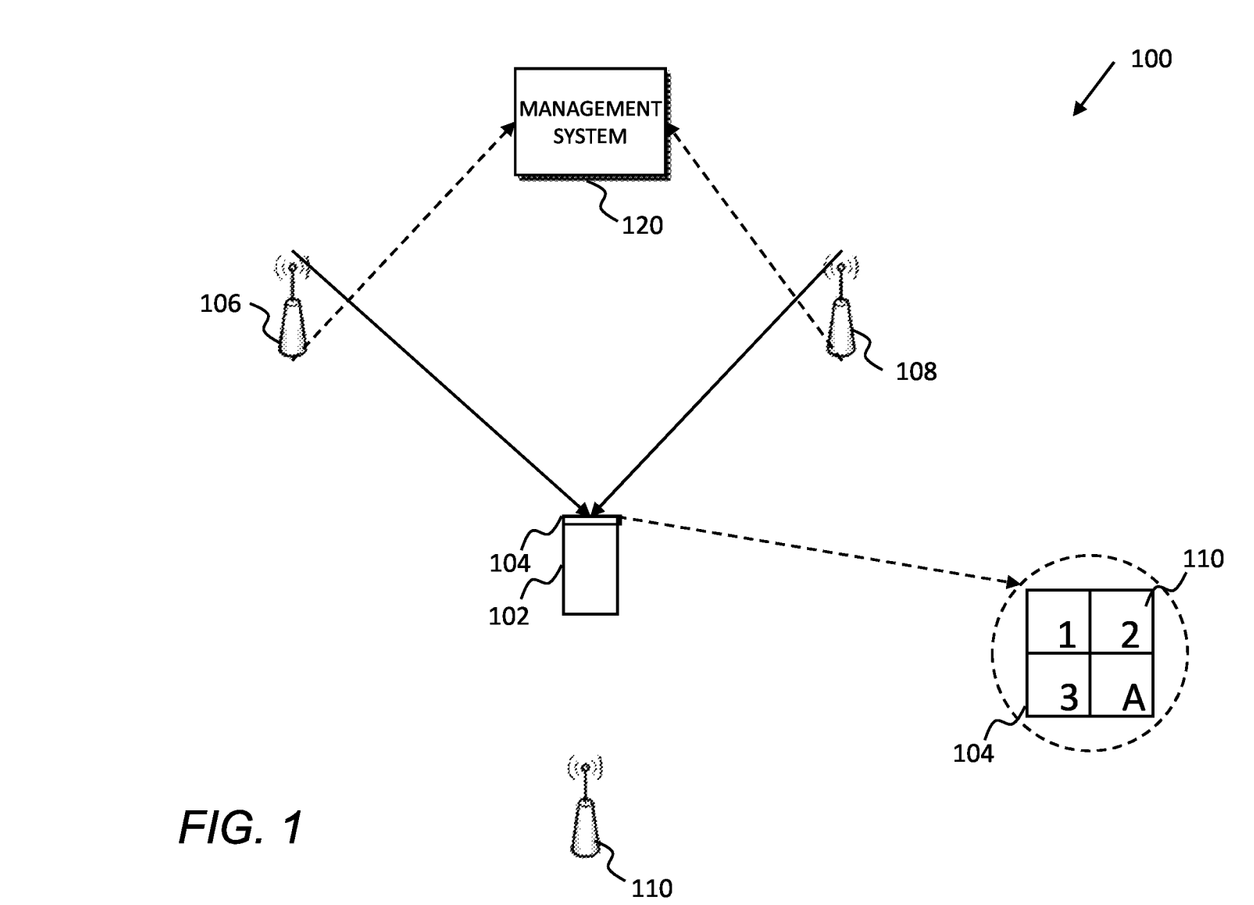
FIG. 1 is a schematic view of a user equipment in relation to a plurality of transit receive points, useful for understanding example embodiments.

FIG. 1 shows in schematic view a UE 102 having an associated radio frequency (RF) antenna 104 for wireless communications. The UE 102 may comprise, for example, a mobile telephone, laptop, tablet computer, digital assistant, wearable computing device, vehicle or craft having communications functionality and indeed any form of mobile apparatus or system having communications functionality that enables it to at least receive radio signals from one or more TRPs, e.g. base stations, over a downlink (DL). The UE 102 is shown in spatial relation to a plurality of base stations, namely first, second and third base stations 106, 108, 110. The first, second and third base stations 106, 108, 110 may comprise, but are not limited to, gNBs.

The first, second and third base stations 106, 108, 110 have respective first, second and third known positions and may be in signal communication, directly or indirectly, with a management system 120 associated with a RAN, which may be a location management function (LMF) or similar.

The management system 120 may store, or have access to, the first, second and third known positions associated with the first, second and third base stations 106, 108, 110. Each of the first, second and third base stations 106, 108, 110 may transmit PRSs which may be received by the UE 102. The ToA is indicative of the time taken for the PRSs to arrive at the UE 102 and also indicative of the distance between the respective first, second and third base stations 106, 108, 110 and the UE. Based on assistance data indicative of, among other data, the first, second and third known positions associated with the first, second and third base stations 106, 108, 110, the UE 102 can determine its own position. Alternatively, the UE 102 may provide the ToA measurements to the management system 120 for making the calculation. Related positioning techniques, known in the art, may be based on received signal time difference (RSTD) and angle of arrival (AoA) methods using similar multilateration principles. In AoA, the PRSs from the respective first, second and third base stations 106, 108, 110 may be measured in terms of the direction of propagation of waves incident on an antenna array of the antenna 104. For example, the AoA can be calculated by measuring the carrier phase of arrival between individual elements 110 of the antenna array. Again, based on AoA measurements, the UE 102 can determine its own position with assistance data, or provide the AoA measurements to the management system 120 for making the calculation.

For completeness, it should also be mentioned that PRSs can be transmitted to the UE 102 by other forms of TRP, namely other UEs in the vicinity, via links which are referred to as sidelinks. This is sometimes referred to as sidelink positioning. For the avoidance of doubt, references to TRPs and base stations herein are considered to not only cover gNBs but also other UEs connected to the UE 102 using respective sidelinks.

Example embodiments relate to systems, methods and/or computer programs for providing improved positioning accuracy for UEs using systems which make use of antennas having multiple elements, such as the multiple elements 110 of antenna 104 indicated in FIG. 1.

Example embodiments may involve using knowledge of the geometry and correlation properties of the UE antenna architecture which comprises multiple elements. Example embodiments may involve using knowledge of a channel property termed as delay-domain sparsity which may be preserved across the multiple elements. Example embodiments enable improved positioning accuracy using ToA and/or AoA calculations which, as will become clear, are not merely based on, for example, averaging ToA and/or AoA estimations or power estimations over multiple elements.

Figure 2:
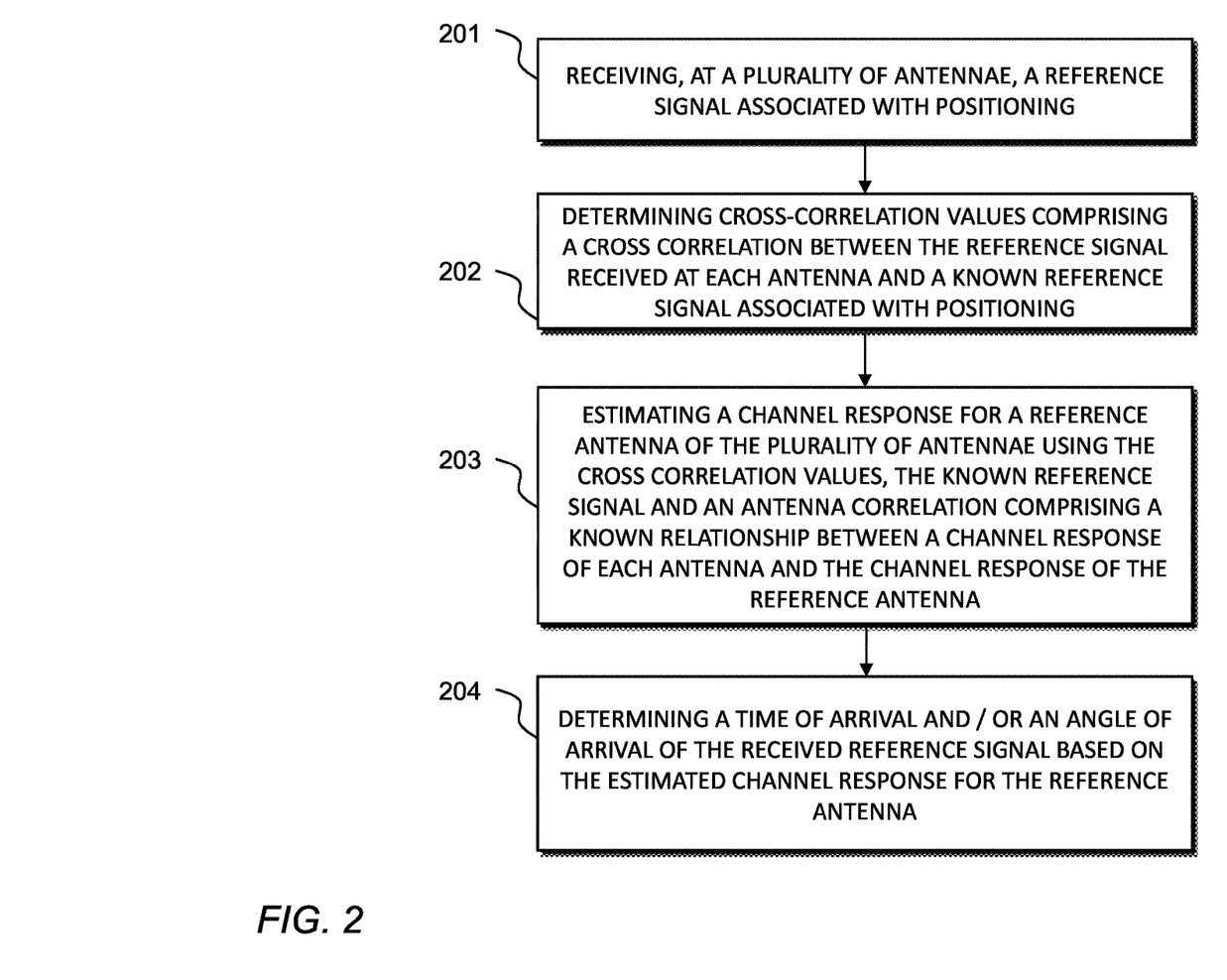
FIG. 2 is a flow diagram indicating processing operations according to some example embodiments.

FIG. 2 is a flow diagram is shown indicating processing operations that may be performed by, for example, the UE 102 of FIG. 1 according to one or more example embodiments. The processing operations may be performed by hardware, software, firmware or a combination thereof. In some embodiments, the processing operations may be performed by one or more controllers or processors of the UE 102, possibly under the control of computer-readable instructions (software code) stored on memory. In some situations, at least some of the processing operations may be performed by systems other than the UE 102, and indeed by any system having an antenna with multiple elements, i.e. antennae, where determination of a ToA and/or AoA based on reference signals is required. Positioning is one such example.

A first operation 201 may comprise receiving, at a plurality of antennae, a reference signal associated with positioning.

A second operation 202 may comprise determining cross-correlation values comprising a cross correlation between the reference signal received at each antenna and a known reference signal associated with positioning.

A third operation 203 may comprise estimating a channel response for a reference antenna of the plurality of antennae using the cross correlation values, the known reference signal and an antenna correlation comprising a known relationship between a channel response of each antenna of the plurality of antennae and the channel response of the reference antenna.

A fourth operation 204 may comprise determining a time of arrival (ToA) and/or an angle of arrival (AoA) of the received reference signal based on the estimated channel response for the reference antenna.

The plurality of antennae may comprise a plurality of elements too of an antenna on a UE 102, such as of the antenna 104 shown in FIG. 1.

The reference signal associated with positioning may comprise a PRS received on the DL from one or more of the first, second and third base stations 106, 108, 110 and/or possibly from one or more other UEs via sidelink(s).

In other embodiments, the plurality of antennae may comprise elements of an antenna array on a base station. In such a case, the reference signal associated with positioning may comprise a sounding reference signal (SRS) received on an uplink (UL) by the base station or any form of TRP.

Determining the ToA of the received reference signal may be based on estimating the time delay in which a maximum power associated with the estimated channel response of the reference antenna occurs. Determining the AoA of the received may be based on estimating the phase of the estimated channel response at which the maximum power associated with the estimated channel response occurs.

Alternatively, or additionally, determining the ToA of the received reference signal may be based on estimating the time delay at which the power associated with the estimated channel response reaches a predetermined threshold. Determining the AoA of the received may be based on estimating the phase (i.e. instantaneous phase or angle) of the estimated channel response at which the power associated with the estimated channel response reaches the predetermined threshold.

In some embodiments, estimating the channel response for the reference antenna may comprise performing the channel estimation based on minimising a function of the difference between the cross-correlation values and a product of a projection matrix and the channel response for the reference antenna, wherein the projection matrix encodes the known reference signal and the antenna correlation.

Estimating the channel response for the reference antenna may additionally or alternatively comprise estimating a set of L-multipath channel response complex gains representing the estimated channel response of the received reference signal, where L is the number of multipath components received by each antenna. In such a case, determining the ToA of the received reference signal may comprise selecting the multipath channel response complex gain from the set of L-multipath channel response complex gains with the maximum power; and determining the time delay associated with the selected multipath channel response complex gain. Alternatively, or additionally, determining the ToA of the received reference signal may comprise selecting the earliest multipath channel response complex gain from the set of L-multipath channel response complex gains with a power that reaches a predetermined threshold; and determining the time delay associated with the selected multipath channel response complex gain. In either case, determining the AoA of the received reference signal may comprise determining the phase of the selected multipath channel response complex gain.

In terms of notation that may be used herein:
$r_s$ may be a vector of the cross-correlation values corresponding the plurality of antennae receiving the reference signal at time index s;
V may be a projection matrix based on the antenna correlation between the channel response of each antenna of the plurality of antennae and the channel response of the reference antenna and autocorrelation values of the known reference signal in relation to the plurality of antennae and L multipath components; and
$\alpha_s^{(1)}$ may be a vector of the set of L-multipath channel response complex gains representing the channel response of the reference antenna for time index s.

Estimating the channel response for the reference antenna may comprise estimating the channel response for the reference antenna based on solving $V\alpha_s^{(1)}=r_s$. For example, estimating the channel response for the reference antenna may involve use of an iterative minimization technique based on at least one for the group of: minimum mean squared error, least squared error and any other minimization technique for solving $V\alpha_s^{(1)}=r_s$.

Figure 3:
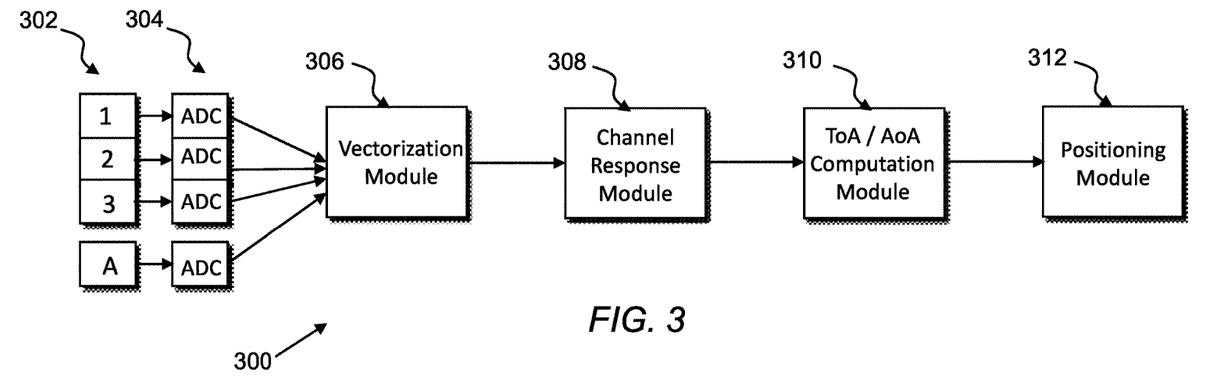
FIG. 3 is a schematic diagram of a system architecture according to some example embodiments.

Referring now to FIG. 3, a hardware architecture 300 for performance of one or more example embodiments is shown. The hardware architecture 300 may be implemented in by hardware, software, firmware or a combination thereof. In some embodiments, the processing operations may be performed by one or more controllers or processors, possibly under the control of computer-readable instructions (software code) stored on memory.

The architecture 300 may comprise a plurality of antennae 302, respectively coupled to analogue to digital converters (ADCs) 304 which provide output to a vectorization module 306. The vectorization module 306 may be configured to determine, inter alia, cross-correlation values comprising a cross correlation between a reference signal received at each antenna and a known reference signal associated with positioning. The vectorization module 306 may be coupled to a channel response module 308. The channel response module 308 may be configured to, inter alia, estimate a channel response for a reference antenna of the plurality of antennae 302 using the cross correlation values provided by the vectorization module 306, the known reference signal and an antenna correlation comprising a known relationship between a channel response of each antenna of the plurality of antennae and the channel response of the reference antenna of the plurality of antennae.

The reference antenna may, for example, be the first antenna of the plurality of antennae 302.

The channel response module 308 may be coupled to the ToA/AoA computation module 310 which may be configured to determine a ToA and/or an AoA of the received reference signal based on the estimated channel response for the reference antenna.

The determined ToA and AoA may be provided to a positioning module 312 which may determine a geographic position, for example of the UE 102 shown in FIG. 2. This may require ToAs and/or AoAs relating to reference signals from other TRPs, e.g. the other base stations or in-vicinity UEs via sidelinks.

A more detailed explanation of the FIG. 3 modules will now be given.

In the vectorization module 306, for a number A of the plurality of antennae 302 (where the antenna index is a and $1 \leq a \leq A$), N reference signal samples for a given time index s are collected, for example represented by a column vector $y_s^{(a)} = [y_s^{(a)}(N), \ldots, y_s^{(a)}(N)]^T$. A cross-correlation may be computed between $y_s^{(a)}$ and a known reference signal (e.g. the transmit sequence) and the result stored in vectors $r_s^{(a)}$ for each of the antennae 302. We can say that $r_s^{(a)} = \Gamma \alpha_s^{(a)} + \xi^{(a)}$, a=1: A. $\Gamma(n,l) = \gamma((n-l)T_s)$. $\gamma$ is the autocorrelation function of the transmit sequence and thus is known. By $\alpha_s^{(a)} = [\alpha_s^{(a)}(1), \ldots, \alpha_s^{(a)}(L)]^T$ we denote the L-multipath channel impulse responses (CIRs) at time index s and antenna a. The $l^{th}$ entry in the vector, i.e. $\alpha_s^{(a)}(l)$ may correspond to the complex gain of the $l^{th}$ multipath component, that is assumed to arrive at the receiver with a delay $lT_s$, where $T_s$ is the sampling time of the system. We may assume that the delays may be mapped to a grid of resolution $T_s$ and length $LT_s$.

The vector $r_s^{(a)}$ collects the observed signal at antenna a, PRS s after cross-correlation. As may be observed from the expression, the vector $r_s^{(a)}$ comprises the contribution of the CIR as observed by antenna a: $\alpha_s^{(a)}$ and the contribution of additive white Gaussian Noise (AWGN) $\xi^{(a)}$. A mapping from the CIR to vector $r_s^{(a)}$ may be realized by the matrix $\Gamma$ which collects the known autocorrelation of the transmit sequence.

Without loss of generality, we might consider the antenna a=1 of the antennae 302 to be the reference antenna and then $\alpha^{(1)}$ to be the reference multipath CIR. Then, the CIR at all other antennae are phase-rotated versions of the reference CIR, rotation being dependent on the antenna correlation (and thus distance between the elements), i.e. $\alpha^{(a \neq 1)} = c(a)\alpha^{(1)}$, where c is a known receiver antenna correlation coefficient vector.

In other words, the CIR at antenna a is dependent on the CIR at antenna a=1, where the dependency is defined by the correlation coefficient c between antenna a and antenna a=1. Then, the received signal across all antennae 302 is concatenated across columns into $r_s = [r_s^{(1)T}, \ldots, r_s^{(A)T}]^T$. This vector $r_s$ contains now the signals seen by all A antennae 302 and contains contributions of all CIRs. Since we have expressed each CIR as a function of the antenna correlation c and the reference CIR, we can re-write $r_s$ to highlight the reference CIR contribution to the received signal as: $r_s = V\alpha_s^{(1)} + \xi_s$, where we define a novel projection matrix $V = [\Gamma^T \ldots c(A)\Gamma^T]_T$.

By doing so, we have obtained a mapping between the received signal at all antennae 302 and the unknown CIR at reference antenna a=1. What is left now is to compute estimates of the reference CIR, from which we can straightforwardly extract ToA and/or AoA information. This may be performed by the channel response module 308 using one or more different computational methods.

As mentioned above, one method is to use an iterative minimization technique based on at least one of minimum mean squared error; least squared error; and any other minimisation technique for solving $V\alpha_s^{(1)} = r_s$.

Figure 4:
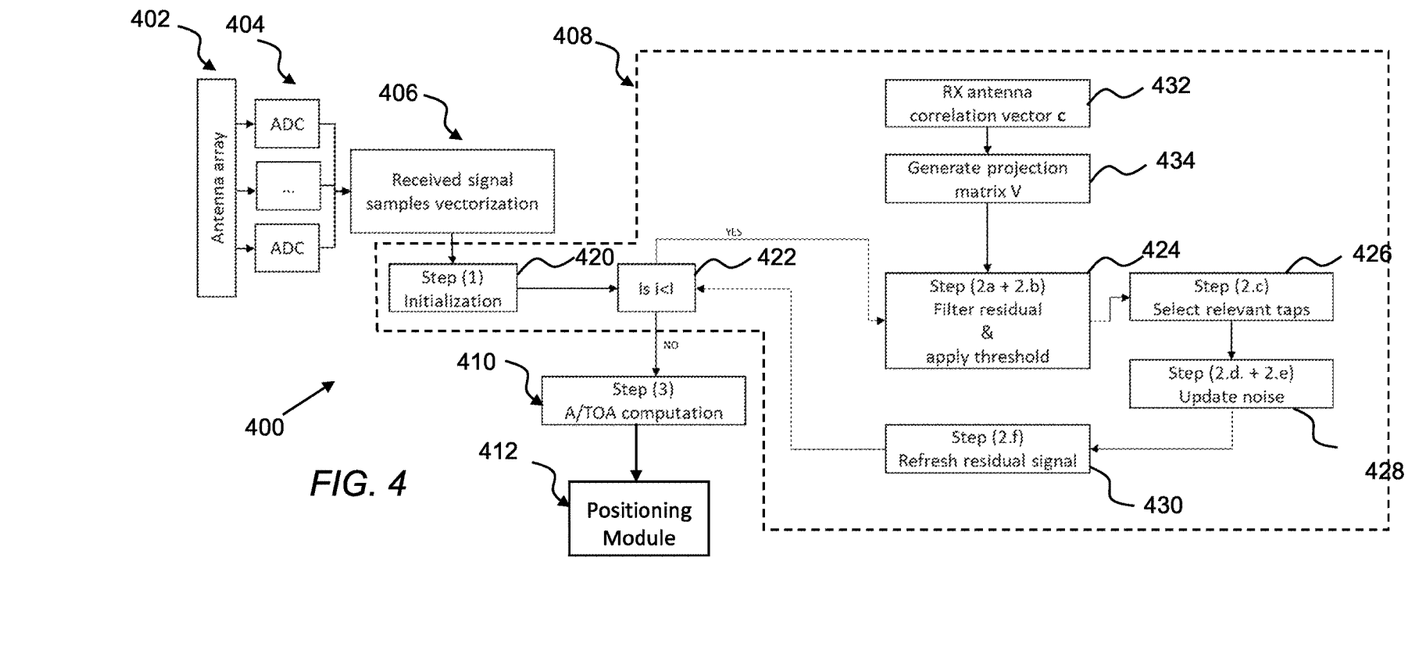
FIG. 4 is a functional diagram indicating operations that may be performed using, for example, the FIG. 3 system architecture.

Referring now to FIG. 4, which is a functional diagram 400 based on the FIG. 3 architecture 300, an example processing method for the channel response module 308 will now be described. The FIG. 4 diagram, similar to FIG. 3, comprises a plurality of antennae, or antenna array 402, respectively coupled to ADCs 404 which provides signal samples as above which are then vectorized in an operation 406. Box 408 indicates example operations that may be performed by the FIG. 3 channel response module 308.

The example operations may involve an iterative minimization technique as follows.

In a first operation 420, a residual signal may be initialised to be $r_s$ and a noise level initialised to be greater than 0.

Operation 422 indicates performance of the following iterative steps i up to a maximum number of iterations I, or until some other metric has converged.

A second operation 424 may comprise a processing of filtering residuals and applying a threshold. For example, this may comprise (iteratively) estimating complex tap gains of $\alpha_s^{(1)}$ by applying a filter based on V to the residual signal and determining those components of the filtered residual signal with a power greater than the noise level, and storing indices of the determined components to an index set.

A third operation 426 may comprise updating a selection of complex tap gains of $\alpha_s^{(1)}$ corresponding to the index set based on V and $r_s$.

A fourth operation 428 may comprise updating the noise level estimate based on the updated complex tap gains of $\alpha_s^{(1)}$, $r_s$, V and the number of samples N.

A fifth operation 430 may comprise refreshing or updating the residual signal based on the index set, updated complex tap gains of $\alpha_s^{(1)}$, $r_s$, and V.

This process of operations may be performed until operation 422 determines the termination criterion is met, at which point the estimated complex tap gains of $\alpha_s^{(1)}$ are output to the ToA/AoA computation module 310 or process 410.

In some embodiments, the noise level, $\sigma_i^2$, may be updated in each i-th iteration based on $$\sigma_i^2 \leftarrow \frac{const.}{\lambda_i}, \text{ where } \lambda_i = \frac{N}{\left\| r_s - v_{I_i}\alpha^{(1)}(I_i) \right\|_2^2},$$

const. is a predetermined constant >0 and $I_i$ is a set of channel indices for which a relevant power was detected.

Referring now to the ToA/AoA computation module 310 in FIG. 3 (and similarly the ToA/AoA computation operation 410 in FIG. 4) determining the ToA of the received reference signal may, in an example embodiment, be based on determining the index of the complex tap gains from the estimated complex tap gains of $\alpha_s^{(1)}$ that has a maximum power value, and estimating the time delay based on multiplication of the determined index and the sampling time, Ts.

Determining the AoA of the received reference signal may be based on estimating the phase of the estimated determined complex tap gain across a plurality of antenna array elements.

Additionally, or alternatively, determining the ToA of the received reference signal may be based on determining the minimum index of a complex tap gain from the estimated complex tap gains of $\alpha_s^{(1)}$ that has a power value above a predetermined threshold, and estimating the time delay based on multiplication of the determined minimum index and the sampling time, Ts.

Determining the AoA of the received reference signal may be based on estimating the phase of the estimated determined complex tap gain.

Thereafter, the positioning module 312 in FIG. 3 (and similarly the positioning operation 412 in FIG. 4) may perform multilateration positioning using the determined ToA/AoA for each of a plurality of reference signals from respective base stations, such as the first, second and third base stations 106, 108, 110 shown in FIG. 1.

Regarding the channel response module 308, another embodiment may involve early stopping of the iterative process. In overview, this may involve estimating and tracking the delay-profile of a predetermined number of components of the channel response estimations and terminating the estimating of the channel response when there is no change to the delay-profile from a previous channel response estimation.

Regarding the channel response module 308, another embodiment may involve using a set of past and current samples in the CIR estimation process. In this case, the UE 102 may generate a super-sequence of received samples by concatenating the samples collected at time instances, where time instances may be OFDM symbols s=0, 1, . . . S, sub frames etc. Here, the UE 102 evaluates how many time instances s should be treated jointly. For example, a static UE 102 may choose a large number of samples S, e.g. tens of symbols, while a fast-moving UE would bundle a few or no symbols. In general, the UE 102 may combine a number of samples N proportional to the channel coherence time, i.e. inversely proportional to the maximum Doppler shift fD: N≈4/fD/Tofdm. The value for fD may be computed using velocity information v from internal sensors as: fD=(v/c)fc, where c=3e8 m/s and fc is the carrier frequency. Having selected N, the UE 102 may generates an observed super signal $r=[r_1^T, \ldots, r_S^T]^T$, $r=[V^T \ldots V^T]^T \alpha^{(1)} + \xi$.

The previously described method from FIG. 4 may be straightforwardly applied, by replacing:

$$r_s \leftarrow r;$$
$$V \leftarrow [V^T, \ldots V^T]^T.$$

Put more succinctly, the channel response module 308 may receive a set of samples of the reference signal for a current time index s, and concatenate the current sets of received samples with one or more past sets of received samples received at the plurality of antenna to form a super-sequence of received samples of the reference signal for use in estimating the channel response of the reference antenna. The number of samples N of the reference signal, may be proportional to the channel coherence time.

Regarding the channel response module 308, another embodiment may involve estimating the channel response for the reference antenna by instantiating the projection matrix V with a dynamic delay resolution d and range R based on:

$$V \leftarrow \begin{bmatrix} \Gamma \\ \ldots \\ c(A)\Gamma \end{bmatrix};$$

$\Gamma(n, 1) = \gamma(nT_s - ld), l = R/d$.

In any of the above embodiments, the reference signal associated with positioning may be an OFDM signal and therefore receiving, at the plurality of antennae, the reference signal may involve OFDM demodulating, for each of the plurality of antennae, a set of OFDM samples of the OFDM reference signal for a current time index s, and concatenating the current sets of received samples with one or more past sets of received OFDM samples received at the plurality of antennae for use in estimating the channel response of the reference antenna.

As indicated above, although example embodiments focus on position determination of a UE 102 based on DL PRS signals, the same principles may be applied at the base station (or TRP) side for UL positioning. For example, the reference signals may be SRSs rather than PRSs.

Figure 5:
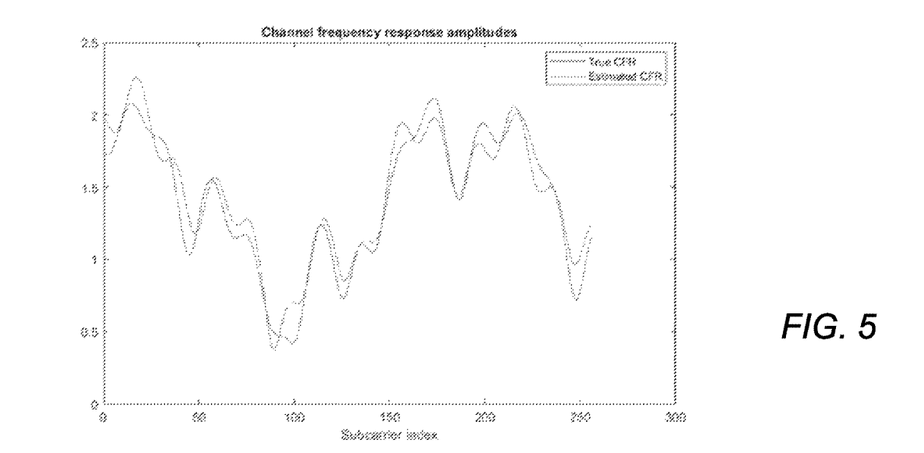
FIG. 5 is a graph indicative of analysis results relating to channel frequency response amplitudes.
Figure 6:
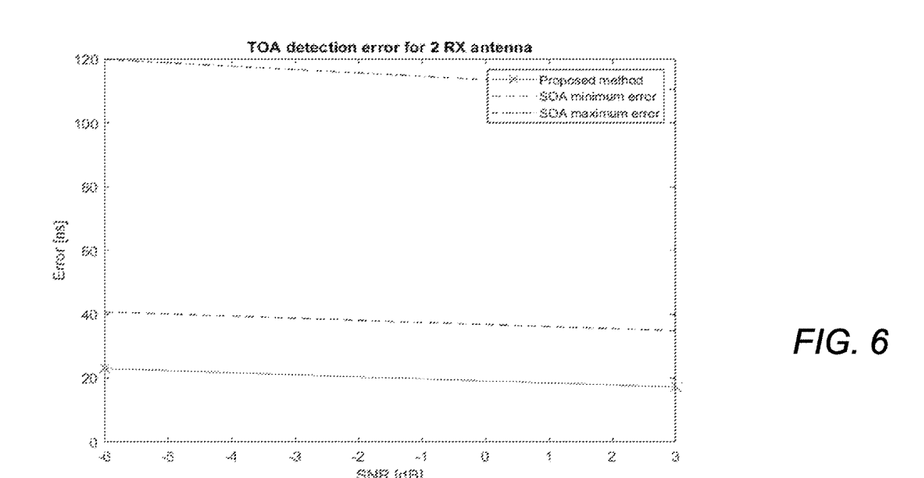
FIG. 6 is a graph indicative of analysis results relating to time of arrival detection errors.

In evaluating the effectiveness of the above-described embodiments, a test scenario involved the use of an antenna array comprising two antennae, a bandwidth of 256 subcarriers for a signal to noise ratio (SNR) range of [−6, 3] dB. With reference to FIGS. 5 and 6, which respectively indicate channel frequency response amplitudes and ToA detection errors, using selected parameter settings of Iteration I=20, const.=1e4 and λ=1, results indicate an approximate 10 dB improvement than that offered using conventional methods, even in a medium to low SNR regime. This is suggestive of a ToA estimate twice as accurate as using conventional methods.

In overview, systems, methods and/or computer programs are described for improved ToA and/or AoA determination, which may be used in radio positioning. Example embodiments achieve this by making use of reference signal received at multiple antennas using techniques different from simply averaging power estimates or ToAs which make certain assumptions that typically do not hold well in, for example, medium to low SNR regimes, such as being far from a cell centre and/or for UEs with non-negligible spatial correlation and/or large form factors.

Example Apparatus

Figures 7, 8:
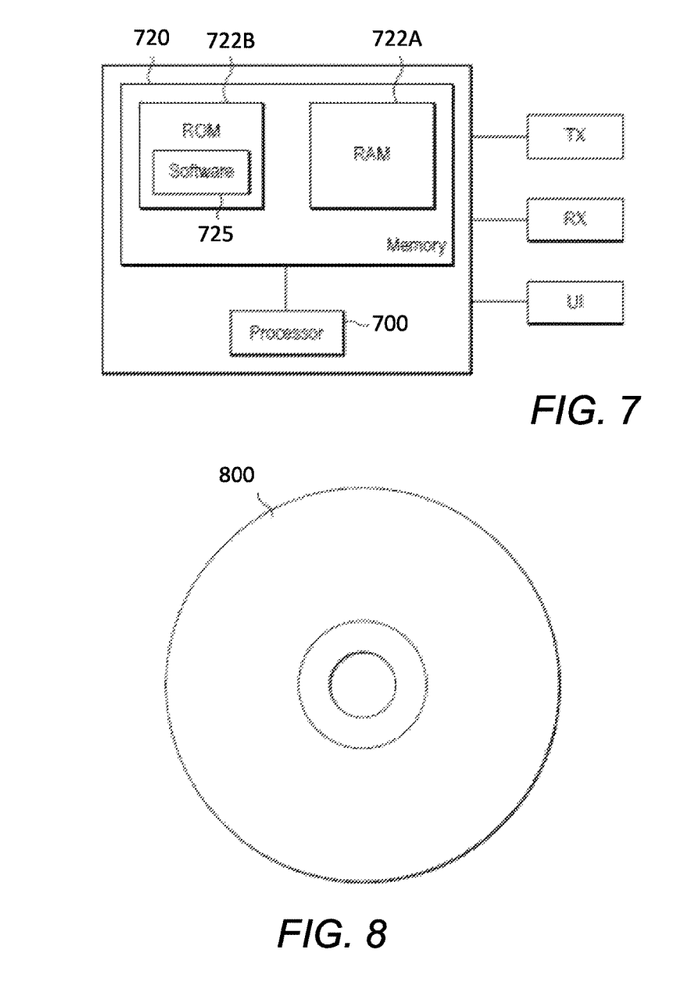
FIG. 7 is a block diagram of an apparatus which may be configured to operate in accordance with example embodiments.
FIG. 8 is an example of a non-transitory medium on which a computer program may be stored for performing operations in accordance with example embodiments.

FIG. 7 shows an apparatus according to some example embodiments, which may comprise, but not limited to, the user terminal 102 shown in FIG. 1. The apparatus may be configured to perform the operations described herein, for example operations described with reference to any disclosed process. The apparatus comprises at least one processor 700 and at least one memory 720 directly or closely connected to the processor. The memory 720 includes at least one random access memory (RAM) 722A and at least one read-only memory (ROM) 722B. Computer program code (software) 725 is stored in the ROM 722B. The apparatus may be connected to a transmitter (TX) and a receiver (RX). The apparatus may, optionally, be connected with a user interface (UI) for instructing the apparatus and/or for outputting data. The at least one processor 700, with the at least one memory 720 and the computer program code 725 are arranged to cause the apparatus to at least perform at least the method according to any preceding process, for example as disclosed above.

FIG. 8 shows a non-transitory media 800 according to some embodiments. The non-transitory media 800 is a computer readable storage medium. It may be e.g. a CD, a DVD, a USB stick, a blue ray disk, etc. The non-transitory media 800 stores computer program code, causing an apparatus to perform the method of any preceding process for example as disclosed in relation to the flow diagrams and related features thereof.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi.

A memory may be volatile or non-volatile. It may be e.g. a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus comprising:
at least one processor; and
at least one memory including computer program code which, when executed by the at least one processor, causes the apparatus to perform:
receiving, at a plurality of antennae, a known reference signal associated with positioning;
determining cross-correlation values comprising a cross correlation between the reference signal received at each antenna of the plurality of antennae and the known reference signal associated with the positioning;
estimating a channel response for a reference antenna of the plurality of antennae using the cross correlation values, using the known reference signal, and using an antenna correlation comprising a known phase relationship between a channel response of each antenna of the plurality of antennae and the channel response of the reference antenna, the known phase relationship causing the channel response of each antenna to be a phase-rotated version of the channel response of the references antenna; and
determining a time of arrival, an angle of arrival, or both the time of arrival and the angle of arrival of the received reference signal based on the estimated channel response for the reference antenna.

2. The apparatus of claim 1, wherein determining the time of arrival of the received reference signal comprises one or both of the following:
determining the time of arrival of the received reference signal based on estimating the time delay in which a maximum power associated with the estimated channel response of the reference antenna occurs; or
determining the angle of arrival of the received reference signal based on estimating the phase of the estimated channel response at which the maximum power associated with the estimated channel response occurs.

3. The apparatus of claim 1, wherein determining the time of arrival of the received reference signal comprises one or both of the following:
determining the time of arrival of the received reference signal based on estimating the time delay at which the power associated with the estimated channel response reaches a predetermined threshold; or
determining the angle of arrival of the received reference signal based on estimating the phase of the estimated channel response at which the power associated with the estimated channel response reaches the predetermined threshold.

4. The apparatus of claim 1, wherein estimating the channel response for the reference antenna comprises performing the channel estimation based on minimising a function of the difference between the cross-correlation values and a product of a projection matrix and the channel response for the reference antenna, wherein the projection matrix encodes the known reference signal and the antenna correlation.

5. The apparatus of claim 1, wherein estimating the channel response for the reference antenna further comprises estimating a set of L-multipath channel response complex gains representing the estimated channel response of the received reference signal, where L is the number of multipath components received by each antenna.

6. The apparatus of claim 5, wherein determining the time of arrival of the received reference signal comprises:
selecting the multipath channel response complex gain from the set of L-multipath channel response complex gains with the maximum power; and
determining the time delay associated with the selected multipath channel response complex gain.

7. The apparatus of claim 6, wherein the determining the angle of arrival of the received reference signal comprises determining the phase of the selected multipath channel response complex gain.

8. The apparatus of claim 5, wherein determining the time of arrival of the received reference signal comprises: selecting the earliest multipath channel response complex gain from the set of L-multipath channel response complex gains with a power that reaches a predetermined threshold; and determining the time delay associated with the selected multipath channel response complex gain.

9. The apparatus of claim 8, wherein the determining the angle of arrival of the received reference signal is configured for determining the phase of the selected multipath channel response complex gain.

10. The apparatus of claim 1, wherein:
$r_s$ is a vector of the cross-correlation values corresponding the plurality of antennae receiving the reference signal at time index s;
V is a projection matrix based on the antenna correlation between the channel response of each antenna of the plurality of antennae and the channel response of the reference antenna and autocorrelation values of the known reference signal in relation to the plurality of antennae and L multipath components; and $\alpha_s^{(1)}$ is a vector of the set of L-multipath channel response complex gains representing the channel response of the reference antenna for time index s; and the estimating the channel response for the reference antenna is configured the estimate the channel response for the reference antenna based on solving $V\alpha_s^{(1)}=r_s$.

11. The apparatus of claim 10, wherein estimating the channel response for the reference antenna comprises using an iterative minimisation technique based on at least one from the group of:
   minimum mean squared error;
   least squared error; and
   any other minimisation technique for solving $V\alpha_s^{(1)}=r_s$.

12. The apparatus of claim 10, wherein estimating the channel response for the reference antenna comprises estimating the channel response using an iterative minimisation technique based on:
   initialising a residual signal to be $r_s$, and a noise level greater than 0;
   for each iteration up to a maximum number of iterations, iteratively estimating complex tap gains of $\alpha_s^{(1)}$ by:
      applying a filter based on V to the residual signal;
      determining those components of the filtered residual signal with a power greater than the noise level, and storing indices of the determined components to an index set;
      updating a selection of complex tap gains of $\alpha_s^{(1)}$ corresponding to the index set based on V and $r_s$;
      updating the noise level estimate based on the updated complex tap gains of $\alpha_s^{(1)}$, $r_s$, V and the number of samples N; and
      updating the residual signal based on the index set, updated complex tap gains of $\alpha_s^{(1)}$, $r_s$, and V;
   wherein, on termination of iteratively estimating the complex tap gains of $\alpha_s^{(1)}$, outputting the estimated complex tap gains of $\alpha_s^{(1)}$.

13. The apparatus of claim 12, wherein determining the time of arrival of the received reference signal comprises one or both of the following:
   determining the time of arrival of the received reference signal based on determining the index of the complex tap gains from the estimated complex tap gains of $\alpha_s^{(1)}$ that has a maximum power value, and estimating the time delay based on multiplication of the determined index and the sampling time, Ts; or
   determining the angle of arrival of the received reference signal based on estimating the phase of the estimated determined complex tap gain.

14. The apparatus of claim 10, wherein, or a number A of the plurality of antennae for $1\leq a\leq A$ in which antenna a=1 is the reference antenna, the estimating the channel response of the reference antenna is configured for estimating a channel response gain vector for the reference antenna, $\widehat{\alpha^{(1)}}$, based on iteratively solving $$\widehat{\alpha^{(1)}} = \operatorname{argmin}\|r_s - V\alpha_s^{(1)}\|_2^2$$

at times, where $r_s=[r_s^{(1)T}, \ldots, r_s^{(A)T}]^T$, where $r_s^{(a)}$ is vector of cross-correlation values between N samples of the received reference signal for antenna a and the known reference signal; the matrix $V=[\Gamma^T, c(2)\Gamma^T, \ldots c(A)\Gamma^T]^T$, where c (a) is the antenna correlation between the reference antenna and antenna a, for $2\leq a\leq A$; $\Gamma$ is an autocorrelation matrix in which $\Gamma(n, l)=\gamma((n-l)T_s)$, $\gamma$ is the autocorrelation function of the known reference signal for sample n and multipath component l for $1\leq n\leq N$ and $1\leq l\leq L$, where N is the number of samples in the received reference signal, L is the number of multipath components and Ts is the sampling time of the system; $\alpha_s^{(1)}=[\alpha_s^{(1)}(1), \ldots, \alpha_s^{(1)}(L)]^T$ is the L-multipath channel response at time index s and reference antenna a=1, in which $\alpha_s^{(1)}(l)$ is the complex gain of the l-th multipath component, for $1\leq l\leq L$.

15. The apparatus of claim 1, wherein estimating the channel response for the reference antenna comprises estimating and track the delay-profile of a predetermined number of components of the channel response estimations and terminating the estimating of the channel response when there is no change to the delay-profile from a previous channel response estimation.

16. The apparatus of claim 1, wherein an individual one of the rotations, for the phase-rotated versions of the channel response of individual antennas relative to the channel response of the reference antenna, is dependent on the antenna correlation at least between the individual and reference antennas.

17. The apparatus of claim 16, wherein the antenna correlation at least between the individual and reference antennas is based on distance between at least the individual and reference antennas.

18. A method comprising:
   receiving, at a plurality of antennae, a known reference signal associated with positioning;
   determining cross-correlation values comprising a cross correlation between the reference signal received at each antenna of the plurality of antennae and the known reference signal associated with the positioning;
   estimating a channel response for a reference antenna of the plurality of antennae using the cross correlation values, using the known reference signal, and using an antenna correlation comprising a known phase relationship between a channel response of each antenna of the plurality of antennae and the channel response of the reference antenna, the known phase on ship causing the channel response of each antenna to be a phase-rotated the channel response of the reference antenna;
   determining a time of arrival, an angle of arrival, or both the time of arrival and the angle of arrival of the received reference signal based on the estimated channel response for the reference antenna.

19. A non-transitory computer readable medium comprising program instructions stored thereon for performing a method, comprising:
   receiving, at a plurality of antennae, a known reference signal associated with positioning;
   determining cross-correlation values comprising a cross correlation between the reference signal received at each antenna of the plurality of antennae and the known reference signal associated with the positioning;
   estimating a channel response for a reference antenna of the plurality of antennae using the cross correlation values, using the known reference signal, and using an antenna correlation comprising a known phase relationship between a channel response of each antenna of the plurality of antennae and the channel response of the reference antenna, the known phase relationship causing the channel response of each antenna to be a phase-rotated version of the channel response of the reference antenna; and determining a time of arrival, an angle of arrival, or both the time of arrival and the angle of arrival of the received reference signal based on the estimated channel response for the reference antenna.

* * * * *